United States Patent
Lo

(10) Patent No.: US 9,020,696 B2
(45) Date of Patent: Apr. 28, 2015

(54) EVENT DATA RECORDER HAVING TRAFFIC MONITORING AND WARNING FUNCTION WITHIN SAFE RANGE

(71) Applicant: Create Electronic Optical Co., Ltd., New Taipei (TW)

(72) Inventor: Chih-Wei Lo, New Taipei (TW)

(73) Assignee: Create Electronic Optical Co., Ltd., New Taipei (TW)

( * ) Notice: Subject to any disclaimer, the term of this patent is extended or adjusted under 35 U.S.C. 154(b) by 58 days.

(21) Appl. No.: 13/926,159

(22) Filed: Jun. 25, 2013

(65) Prior Publication Data

US 2014/0379211 A1 Dec. 25, 2014

(51) Int. Cl.
*G08G 1/16* (2006.01)
*G08G 1/00* (2006.01)
*G01S 13/00* (2006.01)

(52) U.S. Cl.
CPC .. *G08G 1/00* (2013.01); *G01S 13/00* (2013.01)

(58) Field of Classification Search
USPC ........... 701/36, 32.5, 301, 300; 340/903, 435, 340/436; 455/575.9
See application file for complete search history.

(56) References Cited

U.S. PATENT DOCUMENTS

| 7,741,962 B2 * | 6/2010 | Kalik ............................ 340/438 |
| 8,082,014 B2 * | 12/2011 | Causey et al. .............. 455/575.9 |
| 8,447,437 B2 * | 5/2013 | Chiang ............................ 701/1 |
| 2013/0222127 A1 * | 8/2013 | Ray Avalani ................. 340/436 |

* cited by examiner

*Primary Examiner* — Tan Q Nguyen
(74) *Attorney, Agent, or Firm* — Muncy, Geissler, Olds & Lowe, P.C.

(57) ABSTRACT

An event data recorder providing traffic monitoring and warning functions within a safe range is revealed. The event data recorder includes a main body, a plurality of image capture units for capturing an image outside the vehicle and generating an image signal, a vehicle signal capture unit capturing a vehicle signal and sending the vehicle signal into the main body, a sound capture unit that records engine and environmental sounds to generate a sound signal, a storage unit for storage of data. The main body performs data processing and image recognition according to the image and vehicle signals to generate a control signal and check whether the unsafe driving behavior occurred. If the unsafe driving behavior occurred, a warning signal is transmitted to the warning unit to warn the driver. Thus the driving safety is enhanced and the driver's responsibility for accidents is determined.

9 Claims, 4 Drawing Sheets

EVENT DATA RECORDER HAVING TRAFFIC MONITORING AND WARNING FUNCTION WITHIN SAFE RANGE

BACKGROUND OF THE INVENTION

1. Fields of the Invention

The present invention relates to an event data recorder, especially to an event data recorder disposed on a two-wheel or three-wheel vehicle and used for providing traffic detection and warning functions within a safe range.

2. Descriptions of Related Art

There is an urgent need to find out factors affecting driving safety and causes of traffic accidents. The event data recorder in cars available now has multiple functions. However, once the car event data recorders is modified and applied to a two-wheel or three-wheel vehicle, it may have following disadvantages: shock-sensitivity, drop-sensitivity, non-waterproof camera, easy loss, difficult installation, blurry images, indirect power supply, lower efficiency in data access, etc.

Although there are event data recorders for motorcycles (two-wheel vehicle) available now, most of the event data recorders are only used to record image data, without other specific functions provided by components such as signal lights, global positioning system (GPS), G-sensor etc. The signal lights show operation condition of the event data recorder. The GPS records speed and coordinate of the motorcycle. The G-sensor recognizes changes along X/Y/Z axes. When accidents happened, there is no reliable data provided and used as powerful evidence. Moreover, the motor event data recorder is unable to be removed from the motorcycle and carried by the users conveniently. The motor event data recorder is easy to be stolen and this causes losses.

The conventional event data recorders for motorcycles are lack of the function of object detection and recognition. For example, the object can be humans, motorcycles, or different types of cars. The conventional event data recorders for motorcycles also don't include a camera that captures images around the vehicle to avoid the dead angle.

In addition, the conventional event data recorders for motorcycles don't have traffic monitoring and warning functions within a safe range. The above detection function and the warning function are not integrated into the event data recorder.

Thus there is room for improvement and a need to provide a new event data recorder for motorcycles.

SUMMARY OF THE INVENTION

Therefore it is a primary object of the present invention to provide an event data recorder providing traffic monitoring and warning functions within a safe range. The event data recorder detects object moving in the front/rear site of a vehicle and checks whether the object affects the driving safety according to a vehicle signal. Once the object affects the driving safety, a warning sound is sent out to inform the driver. Moreover, the vehicle signal is used in combination with images captured so as to check whether the driving behavior is safe, provide evidence for accidents and determine driver's responsibility for accidents.

In order to achieve the above object, an event data recorder providing traffic monitoring and warning functions within a safe range of the present invention is disposed on a two-wheel or three-wheel vehicle. The event data recorder includes a main body, a plurality of image capture units, a vehicle signal capture unit, a sound capture unit, a storage unit and a warning unit. The main body is a solid body built in with a control unit. The control unit consists of an object detection unit, an object recognition unit and a video/audio compression module. The object detection unit is used to detect whether there is an object in images while the object recognition unit recognizes the object. The video/audio compression module is used for recording and compressing images and sounds. The plurality of image capture units is externally connected to the main body. Each image capture unit is for capturing images outside the vehicle, generating an image signal respectively, and inputting the image signal to the control unit of the main body. The vehicle signal capture unit is externally connected to the main body for capturing a vehicle signal and inputting the vehicle signal to the control unit of the main body. The sound capture unit is connected to the video/audio compression module of the control unit of the main body for recording engine and environment sounds of the moving vehicle and generating a sound signal to be input into the video/audio compression module. The storage unit is built in the main body and is used for storage of data and images processed by the control unit of the main body. The warning unit is connected to the control unit of the main body. Thereby the control unit of the main body detects the object on the front/rear side of the vehicle and recognizes types and movement of the object according to the image signal. Then together with the vehicle signal, the control unit performs data processing and image recognition to generate a control signal and check whether the driving safety is affected. If the safety is affected, the warning unit outputs a warning signal according to the control signal for executing a warning function.

Moreover, the event data recorder of the present invention further includes a three-axis gravity sensor (G-sensor), a global positioning system (GPS), a real-time clock (RTC), a display unit, a sound output unit and a power unit.

The G-sensor is built in the main body and is used for measuring displacement along X/Y/Z axes to generate a sensing signal to be input into the control unit of the main body.

The GPS is a solid body and is connected to the main body by a cable plugged into a GPS port on the main body. The GPS system is used to record coordinates, tracks and routes, generate a driving signal and input the driving signal to the control unit of the main body.

The RTC built in the main body and connected to the control unit is for keeping time.

The display unit for showing the images captured by the image capture unit is built in the main body and is connected to the control unit.

The sound output unit built in the main body and connected to the control unit is for playing the sounds recorded by the sound capture unit.

The power unit provides power to the event data recorder.

DETAILED DESCRIPTION OF THE PREFERRED EMBODIMENT

Figure 1:
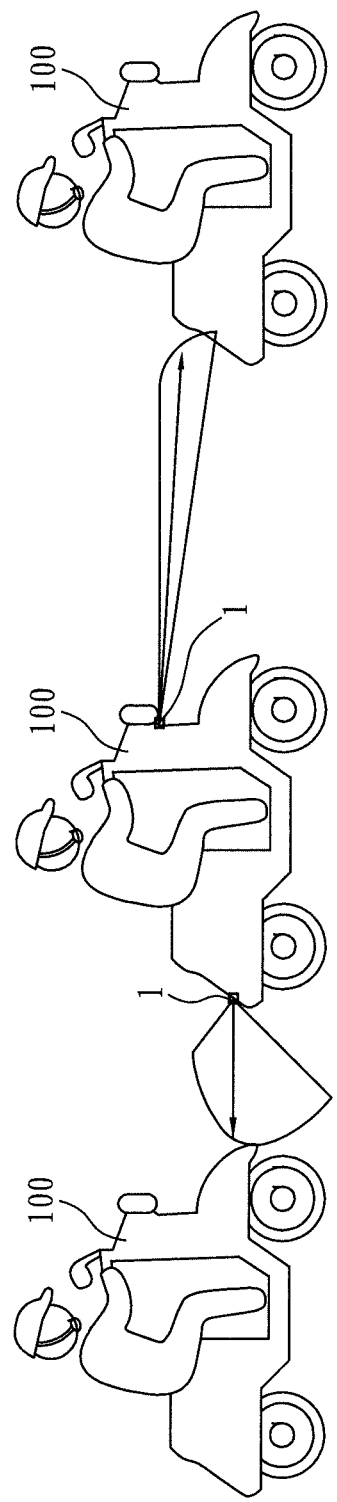
FIG. 1 is a schematic drawing showing an embodiment disposed on a two-wheel vehicle in use according to the present invention.
Figure 2:
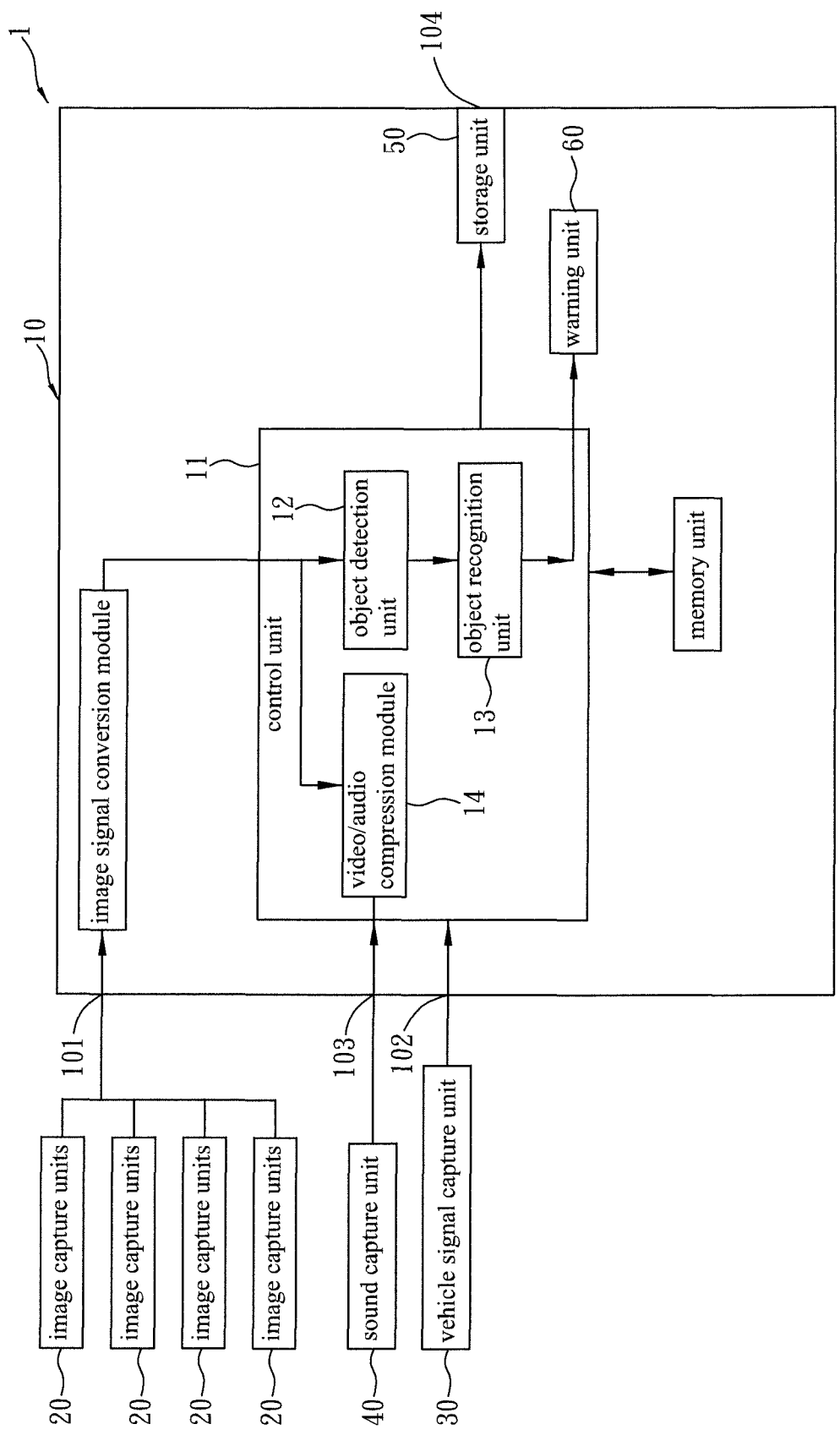
FIG. 2 is a block diagram showing structure of an embodiment according to the present invention.

Refer to FIG. 1 and FIG. 2, an event data recorder 1 of the present invention is disposed on a two-wheel or three-wheel vehicle. The event data recorder 1 includes a main body 10, a plurality of image capture units 20, a vehicle signal capture unit 30, a sound capture unit 40, a storage unit 50 and a warning unit 60.

The main body 10 is a waterproof solid body built in with a control unit 11. The control unit 11 is formed by an object detection unit 12, an object recognition unit 13 and a video/audio compression module 14. The object detection unit 12 is used to detect whether there is any object in images being detected. After the object being detected by the object detection unit 12, the object recognition unit 13 further identifies object types such as pedestrians, motorcycles, cars, trees, different vehicle classes and types etc. The video/audio compression module 14 is used for recording and compressing images and sounds.

Each of the image capture units 20 connected to the main body 10 is used to capture an image outside the car, generate an image signal and input each image signal into the control unit 11 of the mina body 10. In this embodiment, a plurality of image capture units 20 is arranged at a head and a rear of a two-wheel vehicle 100 so as to capture images on front side and rear side of the two-wheel vehicle 100. Each image capture unit 20 is connected to the main body 10 by a cable. Moreover, each image capture unit 20 can be a camera that is connected to the main body 10 by a cable plugged into at least one image capture unit port 101 on the main body 10. Different amount of cameras are installed according to users' needs. The viewing angle of the camera is larger than 70 degrees so as to capture images on the front side and/or rear side or the peripheral side and avoid the dead angle.

The vehicle signal capture unit 30 is externally connected to the main body 10 and used for getting operation information of the two-wheel vehicle 100/or three-wheel vehicle, generating a vehicle signal such as vehicle speed, left turn and right turn lights, brake light etc. associated with the checking of the driving behavior and inputting the vehicle signal into the control unit 11 of the main body 10. Moreover, the vehicle signal capture unit 30 is another solid body and is connected to the main body 10 by a cable plugged into a vehicle signal capture unit port 12 arranged at the main body 10.

The sound capture unit 40 can be built in the main body 10 or externally connected to the main body 10. In this embodiment, the sound capture unit 40 is externally connected to the main body 10 by a cable plugged into a sound capture unit port 103 arranged at the main body 10. The sound capture unit 40 is also connected to the control unit 11 of the main body 10 for recording engine sounds and environmental sounds of the two-wheel vehicle or three-wheel vehicle in the movement and generating a sound signal that is input into the video/audio compression module 14 of the control unit 11 of the main body 10. Moreover, the sound capture unit 40 can be a microphone that works synchronously with each image capture unit 20.

The storage unit 50 is used to store information, images and sounds processed by the control unit 11 of the main body 10. The storage unit 50 is built in the main body 10 and is connected to the control unit 11. The storage unit 50 can be a compact flash (CF) card or secured digital (SD) card, but not limited to. For receiving the storage unit 50, an opening 104 is disposed on s surface of the main body 10. Thus the CF/SD card can be put in and taken out through the opening 104.

The warning unit 60 is built in the main body 10 and is electrically connected to the control unit 11. The control unit 11 generates a control signal according to operation condition of the main body 10. Then in accordance with the control signal, the warning unit 60 outputs a warning signal for execution of a warning effect such as flashing light or buzzing sounds.

Thereby the control unit 11 of the main body 10 detects whether there is an object on the front/rear side of the car according to the image signal, recognizes identity and movement of the object according to the image signal. Then the control unit 11 performs data processing and image recognition in combination with the vehicle signal so as to generate a control signal and check whether the driving safety will be affected. Once the driving safety is affected, the warning unit 60 outputs a warning signal according to the control signal for warning the driver.

Figure 3:
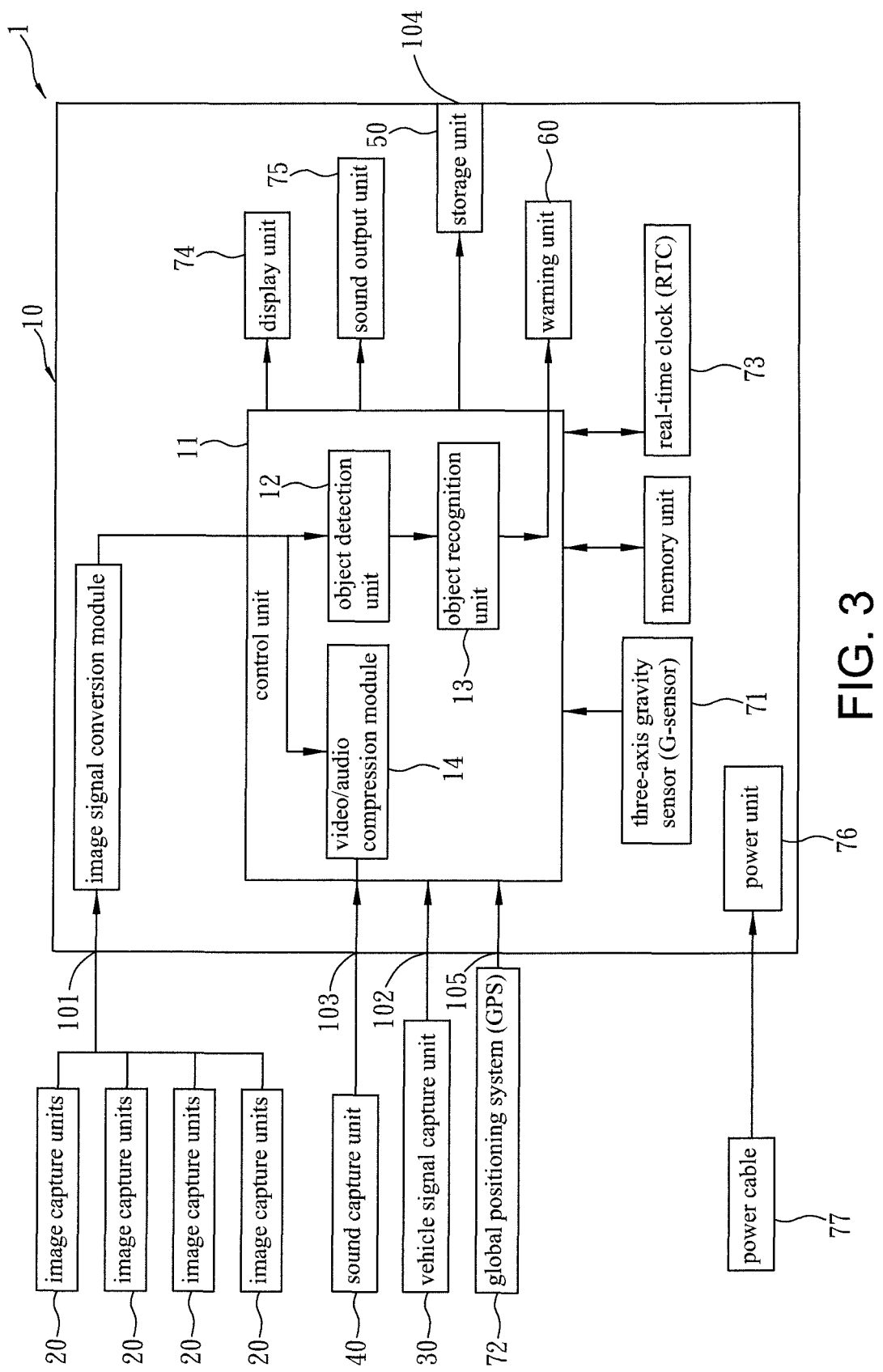
FIG. 3 is a block diagram showing structure of another embodiment according to the present invention.

Refer to FIG. 3, another embodiment is revealed. The difference between this embodiment and the above one is in that this embodiment further includes a three-axis gravity sensor (G-sensor) 71, a global positioning system (GPS) 72, a real-time clock (RTC) 73, a display unit 74, a sound output unit 75 and a power unit 76.

The G-sensor 71 is built in the main body 10 and is connected to the control unit 11 for measuring displacement along X/Y/Z axes and generating a sensing signal to be input into the control unit 11 of the main body 10. For example, while accidents or bumps occur, the vehicle driving state such as speed up, slow down, turn left/right, etc can be learned by recognition of the displacement changes in the three axes. Moreover, G-sensor 71 further provides a function of automatic event trigger recording by which images of accidents are stored in the specified path, without being deleted after retention time.

The GPS system 72 is a solid body and is connected to the main body 10 by a cable plugged into a GPS port 105 on the main body 10. The GPS system 72 is for recording coordinates, tracks and routes, automatically updating global time and data, and generating a driving signal. Then the driving signal is input into the control unit 11 of the main body 10. Moreover, the output data of vehicle speed and driving coordinates can be used to trace the driver's routes and monitor the driving behavior.

The real-time clock (RTC) 73 is built in the main body 1 and is electrically connected to the control unit 11. The RTC 73 is a computer clock that keeps accurate time, also called a timekeeping chip. It has following benefits: low power consumption, frees the main system for time-critical tasks, more accurate than other methods, keep track of the current time, etc. The RTC 73 can continue to keep time while power is off or unavailable. The system time will not be reset after power off.

The display unit 74 is built in the main body 10 and is connected to the control unit 11. The display unit 74 is used for displaying images captured by each image capture unit 20 and starting playback of the images recorded. Thus users can play the images recorded and watch the video immediately at the time they need.

The sound output unit 75 such as a speaker is built in the main body 10 and is connected to the control unit 11 for playing the sounds recorded by the sound capture unit 40 or the warning sounds sent out by the warning unit 60.

The power unit 76 is a power source of the data event recorder 1, the main power of the whole system. After a sudden power loss, the power unit 76 continues to provide power for a period of time so that the image data/file can be turned off safely and the data/file is stored completely. Thus the data/file can be used as powerful evidence when accidents occur. The power unit 76 can further be connected to other power sources such as battery or generator by a power cable 77.

After being input into the control unit 11 of the main body 10, the image signal generated by each image capture unit 20 is compressed by the video/audio compression module 14 and then is input into the storage unit 50. The sounds recorded by the sound capture unit 40 are also compressed by the video/audio compression module 14 and then to be input into the storage unit 50.

Figure 4:
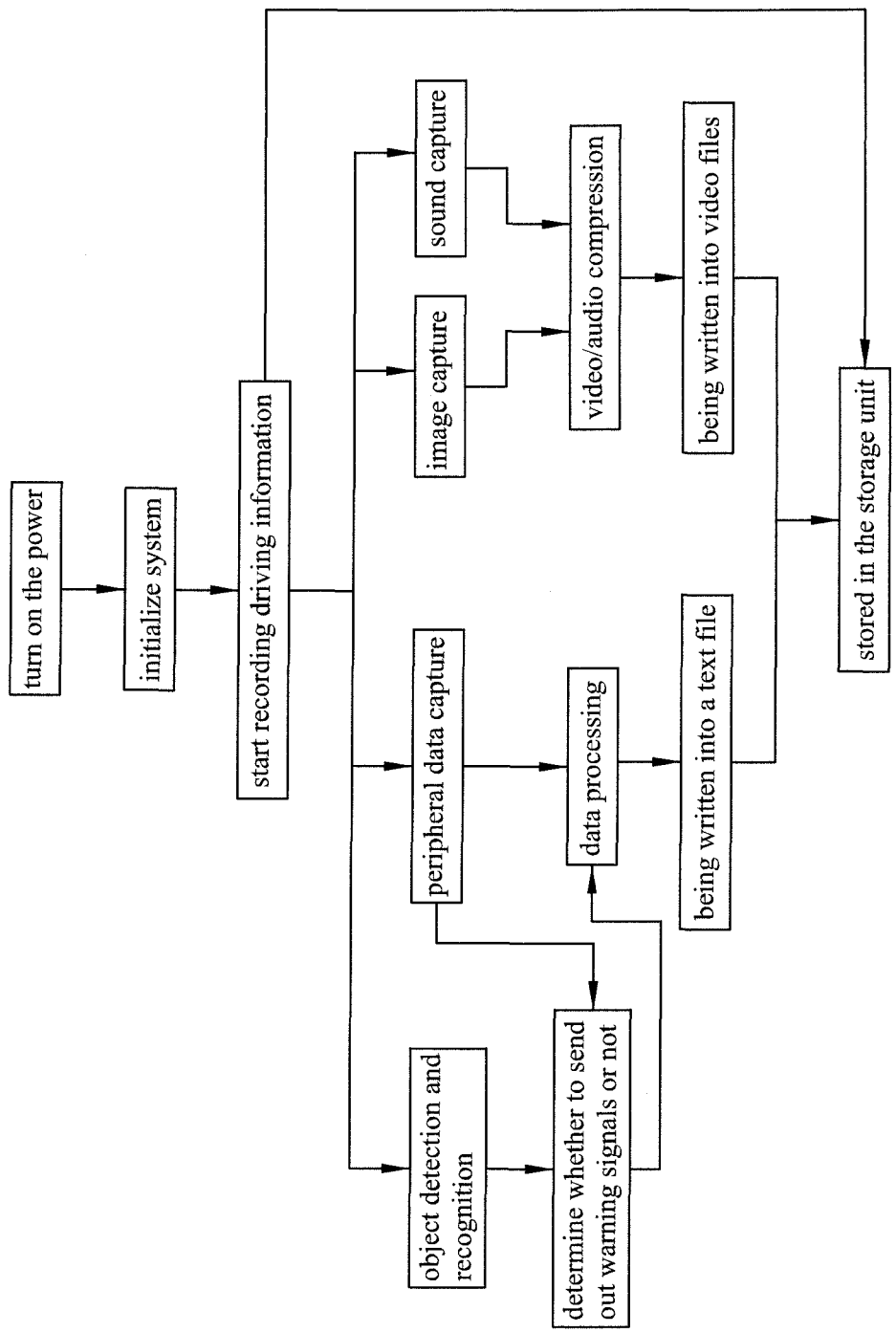
FIG. 4 is a flow chart showing actions of an embodiment according to the present invention.

Refer to FIG. 4, a flow chart showing operation of an event data recorder according to the present invention is revealed. First turn on the power so that the data event recorder is initialized, starting record of driving information such as object detection and recognition, peripheral data capture, image capture and sound capture. To send out warning signals or not is determined according to the result of object detection and recognition and the data then is written into a text file by data processing. The text file is stored in the storage unit. The data of images and sounds captured is written into video files through video/audio compression and then is stored in the storage unit.

In summary, within a preset safe range, the event data recorder detects objects moving in the front side/rear side of the vehicle, checks whether the driving safety is affected by the vehicle signal, and further sends out warning signals to inform the driver. A plurality of image capture units 20 of the present invention can be cameras that handle tasks of recording and detection. Moreover, peripheral data including vehicle signals, GPS signals, three-axis acceleration, time, etc., is captured. These signals that help restore the driving information are used together with images so as to check whether the driving behavior is safe or provide evidence for accidents.

Furthermore, the data event recorder of the present invention also provides object detection and recognition as well as warning function. Thus the traffic accidents are reduced and the driving safety is enhanced. The driver can immediately submit associated driving information such as to playback of the video, G-sensor values, vehicle signals, etc. for determining driver's responsibility for accidents.

In addition, the object detection unit, the object recognition unit and the video/audio compression module require large amount of computation and real time response. In order to meet above requirements, the present invention uses multi-threading to allow synchronized execution of the object detection unit, the object recognition unit and the video/audio compression module. Thereby both the large amount of computation and the real time response are achieved and the cash caused by thread switching is further avoided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An event data recorder providing traffic monitoring and warning functions within a safe range and disposed on a two-wheel vehicle comprising:

a main body that is a solid body built in with a control unit; the control unit having an object detection unit, an object recognition unit, and a video/audio compression module; the object detection unit detects whether there is an object in an image and the object recognition unit recognizes types of the object;

a plurality of image capture units respectively externally connected to the main body for capturing an image outside the vehicle, generating an image signal and inputting the image signal into the control unit of the main body;

a vehicle signal capture unit that is externally connected to the main body for getting operation information of the vehicle, generating a vehicle signal and inputting the vehicle signal to the control unit of the main body;

a sound capture unit that is connected to the control unit of the main body for recording engine sounds and environmental sounds of the vehicle in movement, generating a sound signal, and inputting the sound signal to the video/audio compression module;

a storage unit that is built in the main body and is used for storage of data, images and sounds processed by the control unit of the main body; and a warning unit that is connected to the control unit of the main body;

wherein the video/audio compression module of the control unit of the main body performs recording and compression of the image signal of the image capture unit and the sound signal of the sound capture unit respectively;

wherein the control unit of the main body detects the object on front/rear of the vehicle and recognizes types and movement of the object according to the image signal; then together with the vehicle signal, the control unit performs data processing and image recognition so as to generate a control signal and check whether driving safety is affected; once the driving safety is affected, the warning unit outputs a warning signal according to the control signal for executing a warning function; and wherein the sound capture unit is built in the main body or is connected to a sound capture unit port on the main body by a cable and is connected to the control unit of the main body for recording engine sounds and environmental sounds of the vehicle in movement and sending the sounds recorded to the video/audio compression module to be compressed; the sound capture unit operates synchronously with each image capture unit.

2. The device as claimed in claim 1, wherein each of the plurality of image capture units is a solid body that is connected to at least one image capture unit port on the main body by a cable.

3. The device as claimed in claim 1, wherein the vehicle signal capture unit is a solid body that is connected to a vehicle signal capture unit port at the main body by a cable.

4. The device as claimed in claim 1, wherein the warning unit is built in the main body and is connected to the control unit.

5. The device as claimed in claim 1, wherein the event data recorder further includes a sound output unit; the sound output unit is built in the main body and is connected to the control unit of the for playing the sounds recorded by the sound capture unit or working together with the warning unit to send out warning sounds.

6. The device as claimed in claim 1, wherein the event data recorder further includes a three-axis gravity sensor that is built in the main body for measuring displacement along X/Y/Z axes, generating a sensing signal and inputting the sensing signal into the control unit of the main body.

7. The device as claimed in claim 1, wherein the event data recorder further includes a global positioning system (GPS) that is a solid body and is connected to a GPS port on the main body by a by a cable; the GPS is used for recording coordinates, tracks and routes, generating a driving signal and inputting the driving signal into the control unit of the main body.

8. The device as claimed in claim 1, wherein the event data recorder further includes a real-time clock that is built in the main body, electrically connected to the control unit and used for keeping time; the real-time clock continues to keep time while power is off.

9. The device as claimed in claim 1, wherein the event data recorder further includes a display unit that is built in the main body, connected to the control unit and used for displaying images captured by the image capture unit.

* * * * *